Aug. 15, 1933.      L. L. RICHARDSON      1,922,329
ROCK DRILL
Filed March 5, 1930
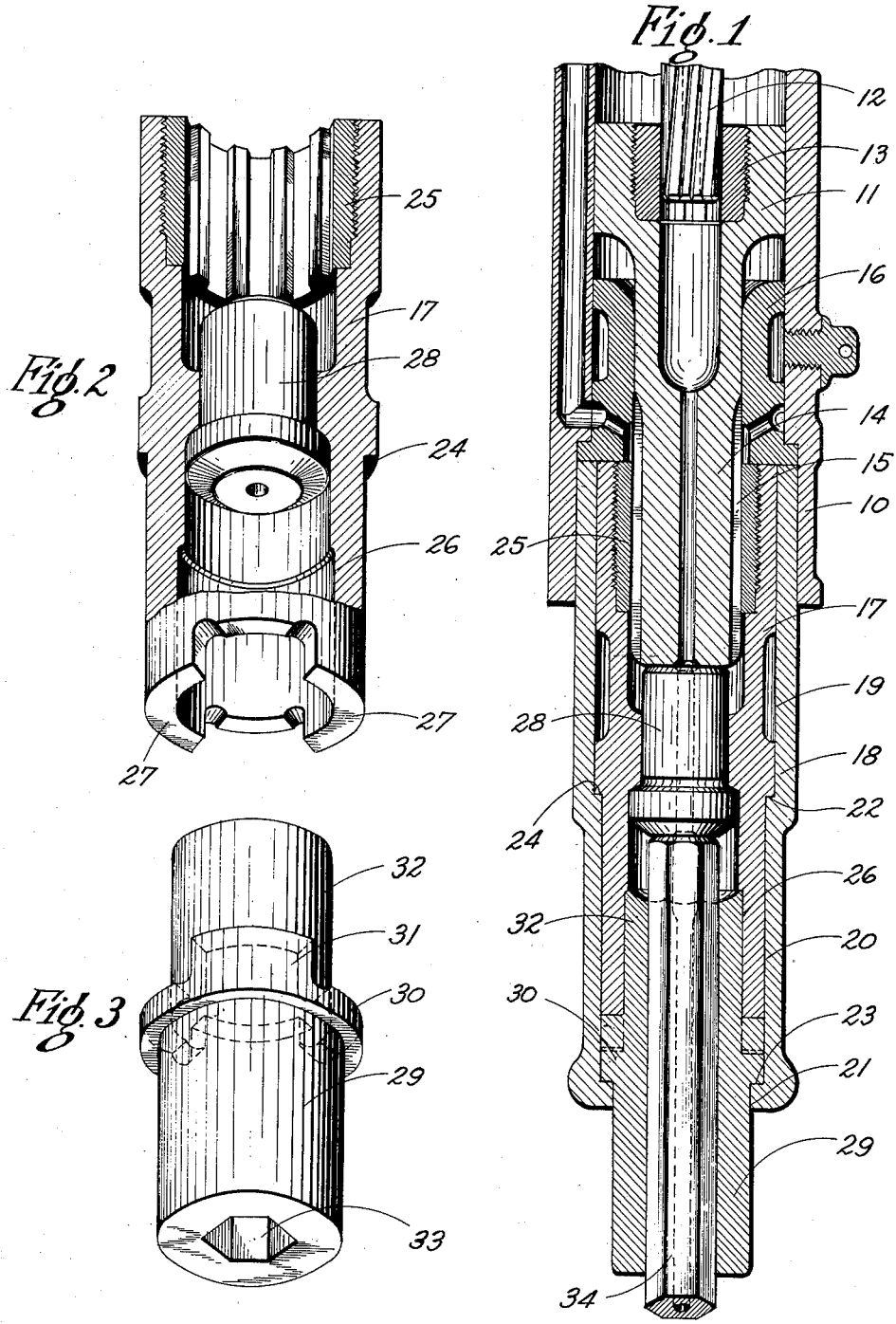
INVENTOR
LED L. RICHARDSON
BY Richey & Watts
ATTORNEYS Patented Aug. 15, 1933

1,922,329

UNITED STATES PATENT OFFICE 1,922,329

ROCK DRILL

Led L. Richardson, Cleveland, Ohio, assignor to The Cleveland Rock Drill Company, Cleveland, Ohio, a Corporation of Ohio Application March 5, 1930. Serial No. 433,345

1 Claim. (Cl. 121—7)

This invention relates broadly to rock drills of the hammer type and more particularly to improvements in construction of the forward portion thereof which includes a driving sleeve, an anvil block, and a driven chuck for tools having shanks of polygonal section.

One of the objects of this invention is to construct a chuck for rock drills which may be readily assembled with the organization and which is adapted to afford liberal wearing surfaces and maximum strength.

Another object of this invention is to provide a chuck for rock drilling machines which will assure the coaxial alignment of the chuck with the driving element therefor and thus minimize the frictional engagement and wear upon the coordinated mechanisms.

Other objects and advantages more or less ancillary to the foregoing and the manner in which the various objects are attained reside in the specific construction and aggroupment of the elements peculiar to this structure, as will become apparent from a more complete examination of this specification, in the claim of which there are assembled certain combinations of parts and specific constructions indicative of the scope and spirit of the invention.

In the drawing

Fig. 1 is a longitudinal sectional view of the forward portion of a rock drill illustrating the form and arrangement of the elements embodied in the present invention;

Fig. 2 is a detail view in perspective and partly in longitudinal section illustrating the driving sleeve and parts which cooperate therewith; and Fig. 3 is a perspective view illustrating the improved chuck.

Referring to the drawing, the numeral 10 designates the cylinder of a rock drill within which is reciprocable a piston 11. Depending from the cylinder head is a rifled stem 12 which cooperates with an internally fluted bushing 13 to effect rotative movement of the piston 11. The outer portion of the piston is formed with a shank 14, upon which the usual longitudinal splines 15 are machined. Mounted snugly within the cylinder 10 is a spacer bushing 16, the inner bore of which provides a bearing for the piston shank 14 and guides the same in its reciprocative movements, the lower annular edge thereof serving as a thrust bearing for the driving sleeve 17. A front head 18 is associated with the end of the cylinder 10, being preferably affixed thereto by the usual bolts or side rods (not shown). This front head is provided with a bore 19 and center bored portions 20 and 21 which form the shoulders 22 and 23 respectively.

The driving sleeve 17 is journalled within the bores 20 and 21, being retained therein by an annular flange 24 which abuts the shoulder 22, and the lower end of the bushing 16. The inner end of the sleeve 17 is provided with an internally splined nut 25 engaged with the splined portion of the shank 14 to transmit the rotative movement of the shank 14 to the sleeve 17. The outer end of the sleeve is formed with a counter bore 26, and is notched in its lower edge to form the jaws 27. Within the driving sleeve 17 is an anvil block 28 arranged to impart the impact of the piston 11 to the cutting tool, as is usual in tools of this type.

The chuck 29 is formed with an external flange 30 adapted to engage the shoulder 23 in the front head to prevent the longitudinal dislocation of the chuck and preferably having sufficient height to provide a slight clearance between the shoulder 22 and the flange 24 so as to obviate precision of manufacturing tolerances. The inner face of the flange 30 is formed with jaws 31 arranged for interlocking engagement with the jaws 27 of the sleeve 17. Adjacent these jaws and extending inwardly therefrom is an integral pilot or extension 32 which snugly engages within the counter bore 26. The chuck 29 is provided with a machined aperture 33 having a polygonal cross-section adapted to receive the shank 34 of the cutting tool.

With the construction described above it is evident that the chuck 29 will be maintained in perfect alignment with the others parts of the mechanism thus overcoming the difficulties encountered in mechanisms of this kind where the chuck has no rear bearing within the driving sleeve and is dependent upon the forward end support. Unless a guiding member is provided the interlocking jaws, due to mis-alignment of the chuck, have a tendency to break or wear. This tendency is prevented in the structure disclosed herein. Should it be necessary to remove or repair the chuck 29, the change can be effectuated readily through the organization of parts and at a minimum cost as the chuck element is the only part which need be discarded.

Although the foregoing is necessarily of a detained character in order to completely set forth the invention, it is to be understood that the specific terminology is not intended to be restrictive or confining and it is to be further understood that various rearrangements of parts and modifications of structural detail may be resorted to without departing from the scope or spirit of the invention as herewith claimed.

I claim:

In a pneumatic drill having a cylinder and a piston reciprocable therein, a tubular extension having a shoulder formed therein and being rigidly joined to the cylinder, a sleeve rotatably mounted within said extension and arranged to abut said shoulder formed therein to prevent longitudinal movement of said sleeve in one direction, means carried by the sleeve and cooperating with the piston to turn the sleeve with the piston, an anvil carried in the sleeve, a chuck extending into the bore of the sleeve and forming a substantially rigid unit therewith, said chuck having a flange intermediate its ends and ears homogeneously formed with the body of said chuck and with said flange, said ears being adapted for interlocking engagement within recesses formed in the end portions of the sleeve, the outer surfaces of said flange and ears having a running fit within said tubular extension, said extension having a shoulder within its end portion to receive and support the said chuck flange, said chuck having a passage therethrough adapted to closely fit and rotatively drive a drill throughout the length of the chuck.

LED L. RICHARDSON.